No. 651,664. Patented June 12, 1900.
A. S. HUBBARD.
SYSTEM OF ELECTRICAL DISTRIBUTION.
(Application filed Apr. 9, 1900.)
(No Model.)
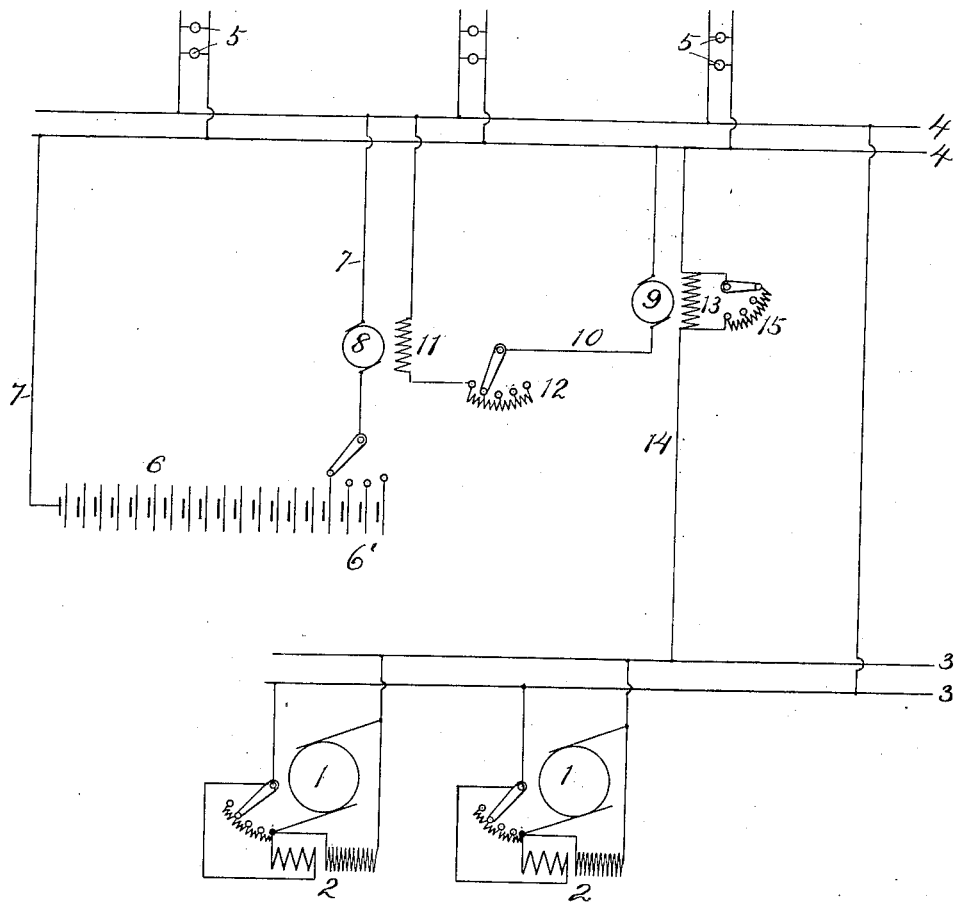

UNITED STATES PATENT OFFICE.

ALBERT S. HUBBARD, OF BELLEVILLE, NEW JERSEY, ASSIGNOR TO THE GOULD STORAGE BATTERY COMPANY, OF NEW YORK, N. Y.

SYSTEM OF ELECTRICAL DISTRIBUTION.

SPECIFICATION forming part of Letters Patent No. 651,664, dated June 12, 1900.

Application filed April 9, 1900. Serial No. 12,097. (No model.)

*To all whom it may concern:*

Be it known that I, ALBERT S. HUBBARD, a citizen of the United States, residing at Belleville, Essex county, in the State of New Jersey, have invented certain new and useful Improvements in Systems of Electrical Distribution, of which the following is a specification.

This invention relates to improvements in systems of distribution, and particularly to a generating, storing, and distributing system involving the use of a storage battery and booster. In such systems there is a tendency of the dynamos on increase of load to take the whole of the load, the batteries, on account of the drop of potential therein, taking no part of the load. This is undesirable, as the batteries should, on the contrary, take their part of the load at such times. This difficulty has generally been overcome by using a differential series coil on the booster, which in such times of heavy load decreases the magnetization and hence electromotive force of the booster, and thus permits the battery to feed to the line. This remedy, however, is open to the objection that its effect continually increases with increase of load, so that there is danger of the battery being dangerously overtaxed. To overcome this objection, I control the magnetization of the booster by a circuit which is in parallel with the load and includes a counter-electromotive-force generator which is responsive to increase of load to decrease the booster-voltage and permit battery-current to flow to the line. The field-magnet of this counter-electromotive-force generator is in series with the load, and the said counter-electromotive-force generator is mechanically connected to the power plant to run at constant speed, so that its regulating action above described will follow in the normal operation of the system. This field-magnet, however, is so wound that on increase of the load to an excessive amount the field magnetization passes over the "knee" of the magnetization-curve—that is, the magnet becomes saturated, so that the booster is not cut down any farther, and the battery is thus safeguarded.

The accompanying drawing represents a system or installation embodying my invention.

1 1 represents the dynamos, with compounded field-magnets 2, the said dynamos being connected to the bus-bars 3 3.

4 4 represent the consumption or lighting circuit, including the translating devices 5, the storage battery 6, with its regulating or "end" cells 6', being connected across the lighting-mains 4 4 in a circuit 7, including the armature 8 of the booster. This armature is driven at approximately-constant speed by suitable means. A motor or counter-electromtive-force generator, also connected to run at substantially-constant speed, has its armature 9 connected in a circuit 10, which includes the field-magnet 11 of the booster and a regulating-rheostat 12. The field-magnet 13 of said motor is connected in series with the load, being included, for example, in a connection 14 between a dynamo bus-bar 3 and the corresponding side 4 of the consumption-circuit. The strength of this field-magnet is controlled by a regulatable shunt-rheostat 15.

In the normal operation of the system the electromotive force furnished by the booster, as adjusted by rheostat 12 and the counter-electromotive-force generator 9, is just about sufficient to balance the difference between the line electromotive force and the battery electromotive force. With the ordinary compounding of the dynamos any increase of load will result in a corresponding drop of electromotive force in the battery, and the tendency of this drop of electromotive force would be to allow current to be forced through the battery or at any rate to prevent the battery feeding to the line. Owing, however, to the opposing effect of the counter-electromotive-force generator 9 the electromotive force applied to the battery-circuit will be correspondingly lowered, thus permitting the battery to feed back to the line and assume a part of the extra load. This effect of the counter-electromotive-force generator is due to the fact that its strength of field up to a certain limit is responsive to the load, its field-magnet being in series with the consumption-circuit, so that as the load increases the counter electromotive force increases and the magnetization of the booster-field is correspondingly decreased. When, however, the limit of magnetization or saturation of the field-magnet 13 of the counter-electromotive-force generator is attained, there will be no further increase in the counter electromotive force developed, and the increase of current-delivery from the battery will be arrested. By proper adjustment of the field-regulating device 15 the point at which the field-magnet saturates may be so adjusted as to limit the maximum current-delivery from the battery to an amount compatible with safety.

The field-regulating device for the counter-electromotive-force generator may be of any suitable form, whether of the rheostatic or the multiple-field-coil type.

I claim—

1. The combination with generating means, and a consumption-circuit supplied therefrom, of a storage battery connected to said circuit, a booster in the battery connection, and a counter-electromotive-force generator connected in circuit with the field-magnet of the booster, and responsive to the load in the consumption-circuit.

2. The combination with generating means, and a consumption-circuit supplied therefrom, of a storage battery and a booster connected in a circuit across the consumption-circuit, a counter-electromotive-force generator, a connection including the armature of said counter-electromotive-force generator and the field-magnet of the booster, and a connection including the field-magnet of said counter-electromotive-force generator, in series with the consumption-circuit.

3. The combination with generating means, and a consumption-circuit supplied therefrom, of a storage battery, a booster, a counter-electromotive-force generator comprising an armature and field-magnet, a connection in parallel with the consumption-circuit, including the storage battery and the armature of the booster, a connection in parallel with the consumption-current including the field-magnet of the booster, and the armature of the counter-electromotive-force generator and a connection in series with the consumption-current including the field-magnet of the counter-electromotive-force generator.

4. The combination with generating means, and a consumption-circuit supplied therefrom, of a storage battery, a booster, a counter-electromotive-force generator comprising an armature and field-magnet, a connection in parallel with the consumption-circuit, including the storage battery and the armature of the booster, a connection in parallel with the consumption-circuit, including the field-magnet of the booster, and regulating means for said field-magnet.

5. The combination with generating means, and a consumption-circuit supplied therefrom, of a storage battery, a booster, a counter-electromotive-force generator comprising an armature and field-magnet, a connection in parallel with the consumption-circuit, including the storage battery and the armature of the booster, a connection in parallel with the consumption-circuit including the field-magnet of the booster, and the armature of the counter-electromotive-force generator and a connection in series with the consumption-circuit including the field-magnet of the counter-electromotive-force generator, and means for regulating the strength of said field-magnet.

ALBERT S. HUBBARD.

Witnesses:
J. GREEN,
A. P. KNIGHT.